Patented Aug. 31, 1954

2,688,018

UNITED STATES PATENT OFFICE 2,688,018

METHOD OF PREPARING ALKALINE EARTH METAL SALTS OF l-LEUCOVORIN

Donna B. Cosulich, Plainfield, N. J., assignor to American Cyanamid Company, New York, N. Y., a corporation of Maine No Drawing. Application June 28, 1952, Serial No. 296,249

4 Claims. (Cl. 260—251.5)

This invention relates to new organic compounds having increased biological activity. More particularly, it relates to 5-formyl-$l$-5,6,7,8-tetrahydropteroyl-L(+)-glutamic acid and salts thereof.

In the past 5-formyl-5,6,7,8-tetrahydropteroylglutamic acid has been described as synthetic citrovorum factor, folinic acid-SF, leucovorin, etc. (Welch et al., Pharmacological Reviews 3, No. 4, 376–377 (1951)). It has been used clinically for controlling the toxicity of aminopterin and other antifolic acid compounds, and as a hematopoietic drug. The product as originally prepared synthetically had a comparatively low activity which has since been increased by treatment of the synthetic product with alkali and other methods. I have now found, however, that the synthetic product is a diasteareoisomeric mixture of the $d$L- and $l$L-forms and that when the $l$-form is separated from the isomeric mixture it has an activity about twice as great as that of the mixture. The biologically active $l$L-isomer is designated $l$-leucovorin.

The compound leucovorin has the following structural formula:

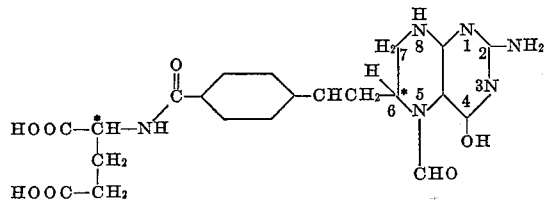

where the carbon atoms marked with an asterisk (*) are optically active. In separating a mixture of optical isomers into its components in the case of acidic substances the usual procedure is to prepare a salt with an optically active base, using alkaloids such as brucine, strychnine, etc. and fractionally crystallizing, since solubility differences are often obtained in this way. However, in preparing a pharmaceutical substance such highly toxic materials are very undesirable as contaminants.

Surprisingly, it was found that the calcium or strontium salt of $l$-leucovorin was much less soluble than the mixture of calcium or strontium $dl$-leucovorin. It is unusual that enough difference in solubility could be obtained by use of a calcium or strontium salt in essentially aqueous medium to allow separation. However, calcium $dl$-leucovorin prepared in the usual manner was soluble in water to the extent of 30–40%. On standing and cooling, calcium $l$-leucovorin separated. This material was recrytallized from water four times to constant rotation $$([\alpha]_D = -15.2°)$$

Its solubility in water is only about 2%. This isomer is approximately twice as active for $Leuconostoc\ citrovorum$ 8081 as is the synthetic mixture ($dl$-leucovorin).

The cationic salt of $l$-leucovorin can be precipitated from substantially aqueous solution in which the concentration of salt is from 3% to about 30%. The $l$-form of the desired salt, being much less soluble than the mixture, separates out first and can be recovered by filtration. Should the compound $l$-leucovorin itself be desired, it can be obtained by treating the salt with a mineral acid.

The following examples illustrate in detail the preparation of representative cationic salts of $l$-leucovorin.

Example 1

A mixture of 88.5 parts of the calcium salt of 5-formyl-$dl$-5,6,7,8-tetrahydropteroyl-L(+)-glutamic acid (rotation about $[\alpha]_D = +14°$) in 885 parts by volume of water is warmed to 50° C. to dissolve. On cooling, 9.4 parts of calcium 5-formyl-$l$-5,6,7,8-tetrahydropteroyl-L(+)-glutamate (rotation $[\alpha]_D$ about $+2°$) is obtained. By further treatment of the mother liquor 12.4 parts more of this product (rotation about $+2°$) is isolated.

By recrystallization of this material from water four times in 5–10% concentration pure calcium 5-formyl-$l$-5,6,7,8-tetrahydropteroyl-L(+)-glutamate with a constant rotation $[\alpha]_D = -15.2°$ is obtained. The biological activity as measured against $Leuconostoc\ citrovorum$ is approximately double the unfractionated synthetic $dl$-mixture. The solubility of the unfractionated mixture in water is approximately 30% to 40%, from which calcium $l$-leucovorin will separate. Its solubility in water is about 2%.

Example 2

To 0.41 parts of 5-formyl-$dl$-5,6,7,8-tetrahydropteroyl-L(+)-glutamic acid in 16.4 parts of water is added sodium hydroxide to pH 7.5, 0.21 parts of strontium chloride hexahydrate and 50 parts by volume of ethanol. The precipitate is filtered, washed and dried to give 0.445 parts of strontium 5-formyl-$dl$-5,6,7,8-tetrahydropteroyl-L(+)-glutamate. This is reprecipitated by dissolving in water and adding ethanol. Finally, the material was dissolved in two parts of water and cooled several days. The crystalline salt is separated by decantation of the liquor and dissolved in 2 parts of water. The solution is treated with one part by volume of ethanol and cooled. After isolation, the precipitate weighs 0.16 parts of strontium 5-formyl-*l*-5,6,7,8-tetrahydropteroyl-L(+) - glutamate, which is more active for *Leuconostoc citrovorum* than the starting material.

I claim:

1. A method of preparing 5-formyl-*l*-5,6,7,8-tetrahydropteroyl-L(+)-glutamic acid which comprises forming an alkaline earth metal salt of the group consisting of calcium and strontium salts of 5-formyl-*dl*-5,6,7,8-tetrahydropteroyl-L(+)-glutamic acid, allowing the more insoluble 5-formyl-*l*-5,6,7,8-tetrahydropteroyl -L(+) - glutamic acid cationic salt to precipitate, separating said precipitate, removing said alkaline earth metal salt radical and recovering said compound therefrom.

2. A method of resolving 5-formyl-*dl*-5,6,7,8-tetrahydropteroyl-L(+)-glutamic acid which comprises forming an alkaline earth metal salt of the group consisting of calcium and strontium salts of the *dl* compound, allowing the more insoluble 5-formyl - *l* - 5,6,7,8 - tetrahydropteroyl-L(+)glutamic acid salt to precipitate, separating said precipitate and removing said alkaline earth metal salt radicals from the separated isomers.

3. A method of preparing calcium 5-formyl-*l*-5,6,7,8-tetrahydropteroyl-L(+)-glutamate which comprises forming a calcium salt of 5-formyl-*dl*-5,6,7,8-tetrahydropteroyl-L(+)-glutamic acid, allowing the more insoluble calcium 5-formyl-*l*-5,6,7,8-tetrahydropteroyl-L(+)-glutamate to precipitate and recovering said product therefrom.

4. A method of preparing strontium 5-formyl-*l*-5,6,7,8 - tetrahydropteroyl - L(+) - glutamate which comprises forming a stronium salt of 5-formyl-*dl*-5,6,7,8-tetrahydropteroyl-L(+)-glutamic acid, allowing the more insoluble strontium 5-formyl-*l*-5,6,7,8-tetrahydropteroyl -L(+) - glutamate to precipitate and recovering said product therefrom.

No references cited.